United States Patent
Kobilansky et al.

(10) Patent No.: US 6,928,192 B2
(45) Date of Patent: Aug. 9, 2005

(54) USER INTERFACE FOR INTERACTIVE REMOVAL OF DEFECTS IN AN IMAGE SEQUENCE

(75) Inventors: Alexander Kobilansky, Ossining, NY (US); James Edward Hanway, Sunnyvale, CA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 677 days.

(21) Appl. No.: 09/838,011

(22) Filed: Apr. 19, 2001

(65) Prior Publication Data

US 2002/0154828 A1 Oct. 24, 2002

(51) Int. Cl.[7] .............................................. G06K 9/40
(52) U.S. Cl. ...................................... 382/275; 382/167
(58) Field of Search ................................ 382/275, 274, 382/254, 149, 162, 167; 348/415.1, 416.1, 417.1, 533, 607, 615, 616; 345/589, 590, 591, 600, 700

(56) References Cited

U.S. PATENT DOCUMENTS

| | | | | |
|---|---|---|---|---|
| 5,687,306 A | * | 11/1997 | Blank | 345/634 |
| 5,917,935 A | * | 6/1999 | Hawthorne et al. | 382/149 |
| 5,974,192 A | * | 10/1999 | Kundu | 382/260 |
| 5,978,523 A | * | 11/1999 | Linford et al. | 382/305 |
| 6,529,622 B1 | * | 3/2003 | Pourjavid | 382/149 |
| 6,583,823 B1 | * | 6/2003 | Shimada et al. | 348/616 |

* cited by examiner

*Primary Examiner*—Yon J. Couso
(74) *Attorney, Agent, or Firm*—Gregory L. Thorne

(57) ABSTRACT

A method and apparatus are disclosed for repairing an image using an image defect matte that indicates portions of an image that have been repaired in previous iterations or are proposed modifications for a current iteration. A user interface incorporates graphical tools that allow the user to modify or manipulate the defect matte and thereby initiate commands that control the selection, detection or repair of one or more defects in an image. For example, the user interface may include commands that allow a user to further repair or cancel a previous repair of a selected region of an image. Each image defect matte may be stored, for example, as an array of elements that assume integer values corresponding to different degrees or steps of repair, such as "original", "repaired" or "new defect." Each matte integer value can be encoded with a different color. Each element of the defect matte corresponds to one or more image pixels. The defect matte can be projected onto the original or repaired image to facilitate the repair process.

18 Claims, 2 Drawing Sheets

USER INTERFACE FOR INTERACTIVE REMOVAL OF DEFECTS IN AN IMAGE SEQUENCE

FIELD OF THE INVENTION

The present invention relates to digital image restoration techniques, and more particularly, to a user interface that facilitates the removal of defects in an image.

BACKGROUND OF THE INVENTION

Digital motion picture restoration involves a variety of image processing operations that require a considerable amount of computations and take a relatively long amount of time, even with powerful computers. An example of a computation-intensive image processing technique is motion estimation, which is required for high fidelity repair. Generally, motion estimation allows a defective region of an image to be replaced with a corresponding image region from a previous or subsequent image frame.

Longer processing times are acceptable if the computations are conducted automatically, without user interaction. Numerous complex algorithms have been developed for automatic image sequence restoration. For a detailed discussion of such image restoration techniques, see, for example, Anil Kokaram, "Motion Picture Restoration," (Springer, 1998). Currently available image restoration techniques, however, do not provide a complete solution. Generally, currently available image restoration techniques suffer from incomplete repair or false detection (or both), resulting in image artifacts. Thus, human intervention is eventually required to complete the image restoration and obtain high quality artifact-free restoration.

Image restoration techniques typically require an operator to work with the original image sequence and the automatically repaired image sequence in an interactive process until the operator is satisfied with the restoration. Generally, the operator reviews the repaired image sequence and accepts, rejects or further modifies each restored image portion. This workflow has certain disadvantages, which if overcome, could greatly improve the efficiency and quality of the restoration process. For example, currently available image restoration systems do not provide a clear indication of areas that have been repaired automatically in current or previous steps. Thus, the operator must carefully investigate every frame in order to determine whether any artifacts were introduced. In addition, current systems do not allow a defect that appears in a number of consecutive frames, for example, caused by dirt on the camera lens, to be repaired in an efficient manner.

A need therefore exists for a method and apparatus for removing defects from images that provides a better user interface for image sequence repair. A further need exists for a method and apparatus for removing defects from images that provides an improved mechanism for repairing a defect that appears in a number of consecutive frames.

SUMMARY OF THE INVENTION

Generally, a method and apparatus are disclosed for repairing an image that provides an improved user interface that allows a user to modify an image defect matte indicating portions of an original image that have been repaired in previous iterations or are proposed modifications for a current iteration. The user interface incorporates graphical tools that allow the user to modify or manipulate the defect matte and thereby initiate commands that control the selection, detection or repair of one or more defects in an image. For example, the user interface may include commands that allow a user to further repair or cancel a previous repair of a selected region of an image.

Each image defect matte may be stored, for example, as an array of elements that assume integer values. For example, the integer values may be mapped to a limited set representing different degrees or steps of repair. For example, the set of possible matte values can include "original" (unmodified), "repaired" (automatically or manually in a previous step) and "new defect" (marked for further repair). Each of the matte integer values can be encoded with a different color. Each element of the defect matte corresponds to one or more image pixels. Thus, the defect matte can be projected onto the original or repaired image to facilitate the repair process.

The disclosed image defect removal system can also determine a defect metric for each image defect matte that quantifies the extent of the defects in the corresponding image. The defect metric can indicate, e.g., the number of defects in a given image defect matte or a sum of the image area having a defect. In this manner, the defect metric can be employed to prioritize the images in need of repair or to traverse each image frame having a defect metric above a predefined threshold.

A more complete understanding of the present invention, as well as further features and advantages of the present invention, will be obtained by reference to the following detailed description and drawings.

DETAILED DESCRIPTION

Figure 1:
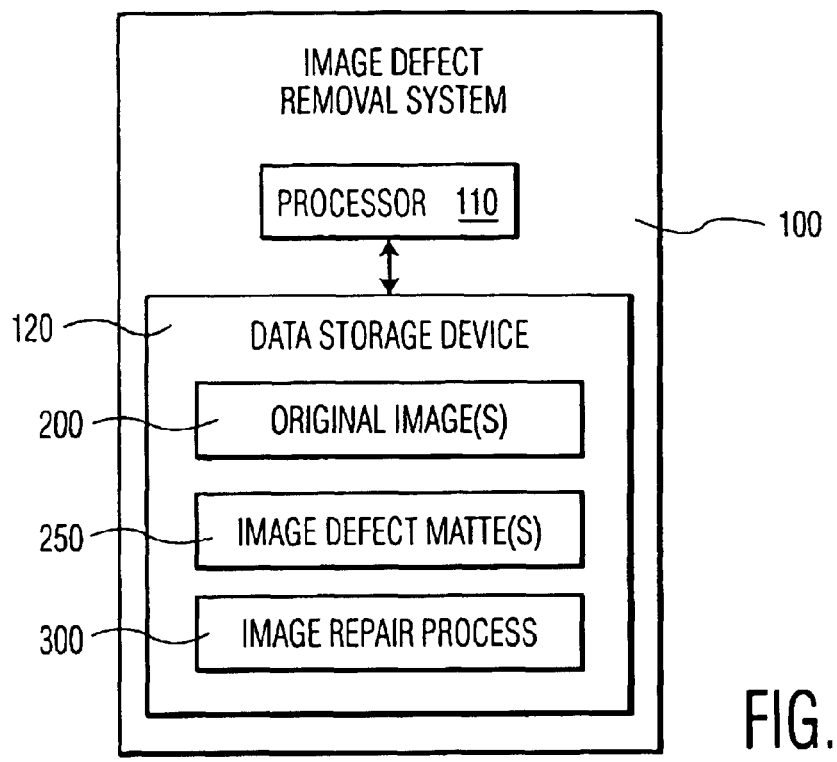
FIG. 1 illustrates an image defect removal system in accordance with the present invention.

FIG. 1 illustrates an image defect removal system 100 in accordance with the present invention. As shown in FIG. 1, the image defect removal system 100 includes certain standard hardware components, such as a processor 110 and a data storage device 120, such as a read-only memory and/or a random access memory (RAM). The data storage device 120 includes one or more original images 200, discussed below in conjunction with FIG. 2A, one or more image defect mattes 250, discussed below in conjunction with FIG. 2B, and an image repair process 300, discussed below in conjunction with FIG. 3. Generally, the image repair process 300 employs a user interface in accordance with the present invention that indicates image areas that have been repaired or are proposed for repair and allows a user to initiate commands that control the selection, detection or repair of one or more defects in an image.

The methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a recordable medium (e.g., floppy disks, hard drives, compact disks, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk.

Data storage device 120 will configure the processor 110 to implement the methods, steps, and functions disclosed herein. The data storage device 120 could be distributed or local and the processor 110 could be distributed or singular. The data storage device 120 could be implemented as an electrical, magnetic or optical memory, or any combination of these or other types of storage devices. It should be noted that, although data storage device 120 is shown separately from other elements of the image defect removal system 100, this is not necessarily the case for all applications. Moreover, the term "memory" or "data storage device" should be construed broadly enough to encompass any information able to be read from or written to an address in the addressable space accessed by processor 110. With this definition, information on a network is still within data storage device 120 of the image defect removal system 100 because the processor 110 can retrieve the information from the network. In a further variation, the image defect removal system 100 may be embodied as an application specific integrated circuit (ASIC) that may be incorporated, for example, in a workstation or other image processing device.

Figure 2A:
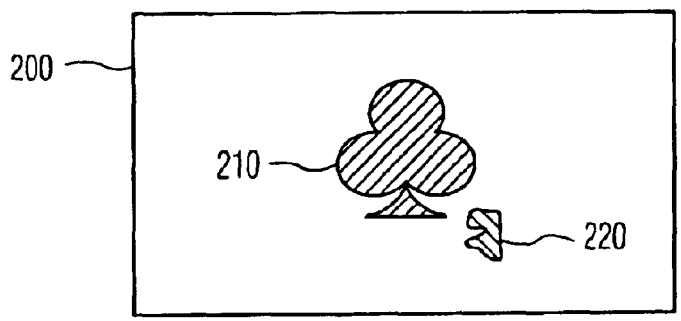
FIG. 2A illustrates an original image that may be repaired in accordance with the present invention.

FIG. 2A illustrates an exemplary original image that may be repaired by the image defect removal system 100 in accordance with the present invention. As shown in FIG. 2A, the image 200 includes one or more objects, such as the object 210, and one or more defect regions, such as the defect 220 corresponding, for example, to dirt on a camera lens.

Figure 2B:
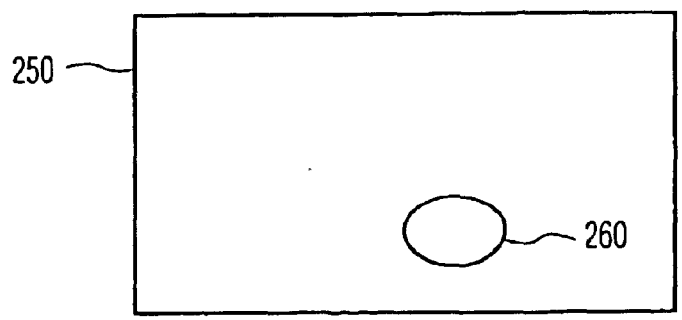
FIG. 2B illustrates an image defect matte indicating portions of the original image of FIG. 2A that have been repaired in accordance with the present invention.

FIG. 2B illustrates an image defect matte 250. As previously indicated, the image defect matte 250 indicates portions of an original image that have been repaired in previous iterations or are proposed modifications for a current iteration. In addition, user interface incorporates graphical tools that allow the user to modify or manipulate the defect matte 250 and thereby initiate commands that control the selection, detection or repair of one or more defects in an image. In the exemplary image defect matte 250 shown in FIG. 2B, the matte 250 includes a region 260 indicating a user-specified region of the original image that the user would like to have repaired (or further repaired).

Each image defect matte 250 may be stored, for example, as an array of elements that assume integer values. For example, the integer values may be mapped to a limited set, representing different degrees or steps of repair. In the exemplary embodiment, the set of possible values allows each region of an image to be marked as "original" (unmodified), "repaired" (automatically or manually in a previous step) and "new defect" (for further repair). Each element of the defect matte 250 corresponds to one or more image pixels. This correspondence defines the projection of the defect matte 250 onto the original or repaired image, discussed below in conjunction with FIG. 2C.

Figures 2C, 3:
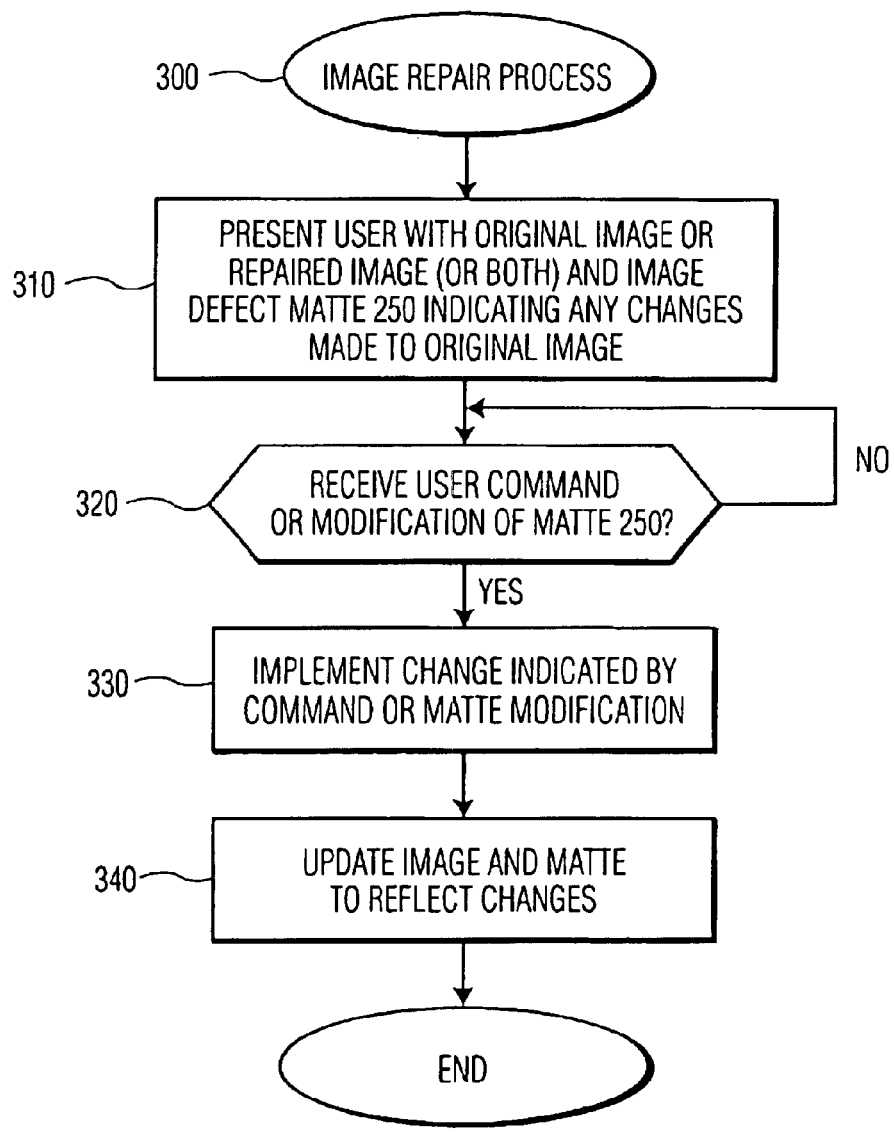
FIG. 2C illustrates the original image of FIG. 2A superimposed with the image defect matte of FIG. 2B.
FIG. 3 is a flow chart describing an exemplary image repair process embodying principles of the present invention.

In one embodiment, different values of the defect matte are encoded with different colors. In the embodiment shown in FIG. 2B, the defect matte 250 includes a boundary 260 drawn around pixels with the same matte value, such as a given boundary around a pixel region that the user has marked as a "new defect" for further repair. It is noted that pixels in the repaired image that correspond to defect matte elements that have an "original" value always coincide with the original image. FIG. 2C illustrates the original image 200 of FIG. 2A superimposed with the image defect matte 250 of FIG. 2B.

FIG. 3 is a flow chart describing an exemplary image repair process 300. As previously indicated, the image repair process 300 employs a user interface indicating image areas that have been repaired or are proposed for repair and allows a user to initiate commands that control the selection, detection or repair of one or more defects in an image. In the exemplary embodiment shown in FIG. 3, it is assumed that the user starts with a blank matte 250 corresponding to an unmodified original image 200. The present invention may also be employed in an environment where defects are initially identified and repaired using an automated approach. Thus, in such an automated environment, the defect matte 250 would initially indicate any defects identified or repaired by the automatic process, as would be apparent to a person of ordinary skill in the art.

As shown in FIG. 3, the image repair process 300 initially presents the user with the original image 200 or the repaired image (or both) and optionally the image defect matte 250 during step 310. Thereafter, a test is performed during step 320 to determine if a user command or modification of the matte 250 is received. The user command can include, for example, a selection of image areas in the defect matte 250 with a "repaired" value representing false defects, and changing the selected defect matte elements from "repaired" to "original." In this manner, corresponding pixels in the repaired image will be replaced with pixels from the original image 200.

In one variation, the user's actions immediately affect only the defect matte 250 rather than the image itself, and the image is not modified until affirmatively initiated by the user.

If it is determined during step 320 that a user command or modification of the matte 250 is not received, then program control returns to step 320 until such a user command or modification of the matte 250 is received.

Once it is determined during step 320 that a user command or modification of the matte 250 is received, then the change indicated by the received command or matte modification is implemented during step 330. Finally, the image 200 and the defect matte 250 are updated during step 340 to reflect the changes indicated by the received command or matte modification, before program control terminates.

In further variations, depending upon context, the changing of the defect matte 250 may or may not result in subsequent automatic changes of the repaired image. An example of an automatic change is canceling a defect or multiple defects. An example of a delayed change of the repaired image is repair of steady dirt that persists for more than one frame. The user may easily mark defective areas in subsequent frames. The immediate result of marking defective areas will be changes to the defect matte 250, with elements of the defect matte changing their values to "new defect." In such an embodiment, an additional user command is thereafter required to perform the actual repair.

In a further variation, the image defect removal system 100 can also determine a defect metric for each image defect matte 250. Generally, the defect metric quantifies the extent of the defects in the corresponding image 200. For example, the defect metric can indicate the number of defects in a given image defect matte 250 or a sum of the image area having a defect. In this manner, the defect metric can be employed to prioritize the images in need of repair. In yet another variation, the defect metric can be employed as a filter for navigational purposes, such that a user can easily traverse each image frame having a defect metric above a predefined threshold.

It is to be understood that the embodiments and variations shown and described herein are merely illustrative of the principles of this invention and that various modifications may be implemented by those skilled in the art without departing from the scope and spirit of the invention.

What is claimed is:

1. A method for repairing an image, comprising the steps of:
   presenting a user with said image; and
   presenting said user with an image defect matte indicating areas of said image that contain image errors, said image defect matte allowing said user to graphically specify one or more changes to be made to said image, wherein said image defect matte is an array of elements, each of said elements assuming one of several possible values representing different degrees of repair between said image and a repaired image.

2. The method of claim 1, wherein each element of said image defect matte corresponds to one or more pixels in said image.

3. The method of claim 1, wherein said image defect matte indicates each of said different possible values using a color mapping with different colors corresponding to each of said different possible values.

4. The method of claim 1, wherein said image defect matte indicates a region of said image having one of said different possible values using a boundary outline.

5. The method of claim 1, wherein said changes to be made to said image are not implemented until initiated by said user.

6. The method of claim 1, further comprising the step of providing one or more graphical tools that allow said user to modify said image defect matte before said changes are made to said image.

7. The method of claim 1, wherein said image detect matte indicates portions of an original image that have been repaired in one or more previous iterations.

8. The method of claim 1, wherein said image defect matte indicates portions of an original image having one or more proposed error corrections for a current iteration.

9. The method of claim 1, wherein said one or more changes to be made to said image is a further repair of a selected region of said image.

10. The method of claim 9, further comprising the step of maintaining said selected region of said image for a subsequent or previous frame to repair a steady defect in said image.

11. The method of claim 1, wherein said one or more changes to be made to said image is a cancellation of a previous repair of a selected region of said image.

12. The method of claim 1, further comprising the step of prioritizing said image based on a defect metric that quantifies a degree of defects in said image.

13. A system for repairing an image, comprising:
    a memory that stores computer-readable code; and
    a processor operatively coupled to said memory, said processor configured to implement said computer-readable code, said computer-readable code configured to:
    present a user with said image; and
    present said user with an image defect indicating areas of said image that contain image errors, said image defect matte allowing said user to graphically specify one or more changes to be made to said image, wherein said image defect matte is an array of elements, each of said elements assuming one of several possible values representing different degrees of repair between said image and a repaired image.

14. The system of claim 13, wherein each element of said image defect matte corresponds to one or more pixels in said image.

15. The system of claim 13, wherein said processor is further configured to provide one or more graphical tools that allow said user to modify said image defect matte before said changes are made to said image.

16. The system of claim 13, wherein said one or more changes to be made to said image is a further repair of a selected region of said image and wherein said processor is further configured to maintain said selected region of said image for a subsequent or previous frame to repair a steady defect in said image.

17. The system of claim 13, wherein said processor is further configured to prioritize said image based on a defect metric that quantifies a degree of defects in said image.

18. An article of manufacture for repairing an image, comprising:
    a computer readable medium having computer readable code means embodied thereon, said computer readable program code means comprising:
    a step to present a user with said image; and a step to present said user with an image defect matte indicating areas of said image that contain image errors, said image defect matte allowing said user to graphically specify one or more changes to be made to said image, wherein said image defect matte is an array of elements, each of said elements assuming one of several possible values representing different degrees of repair between said image and a repaired image.

* * * * *